Oct. 3, 1933.  H. D. NEWHART  1,928,866
DISK BRAKE
Filed Dec. 9, 1929     2 Sheets-Sheet 1
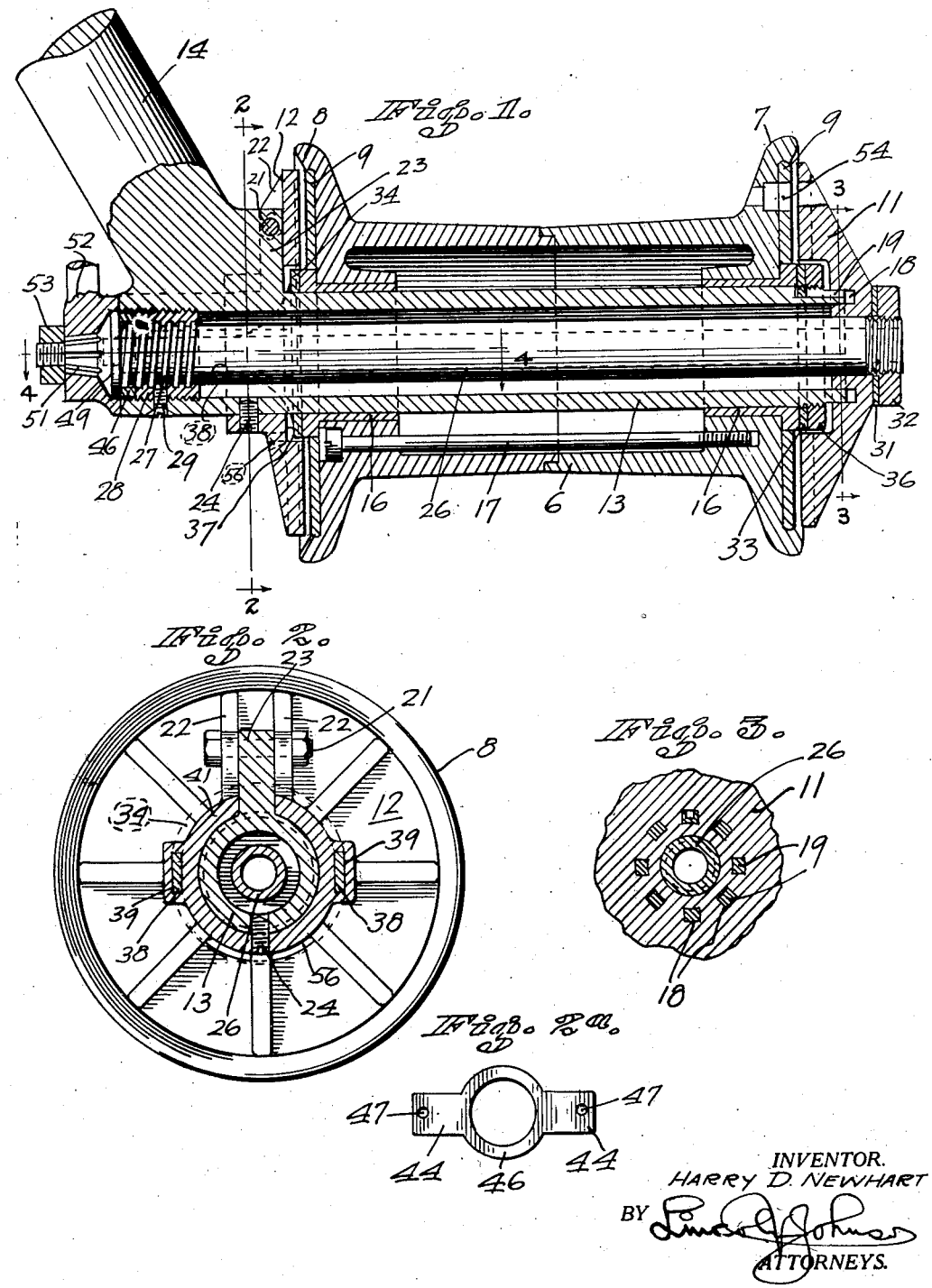
INVENTOR.
HARRY D. NEWHART
BY
ATTORNEYS.

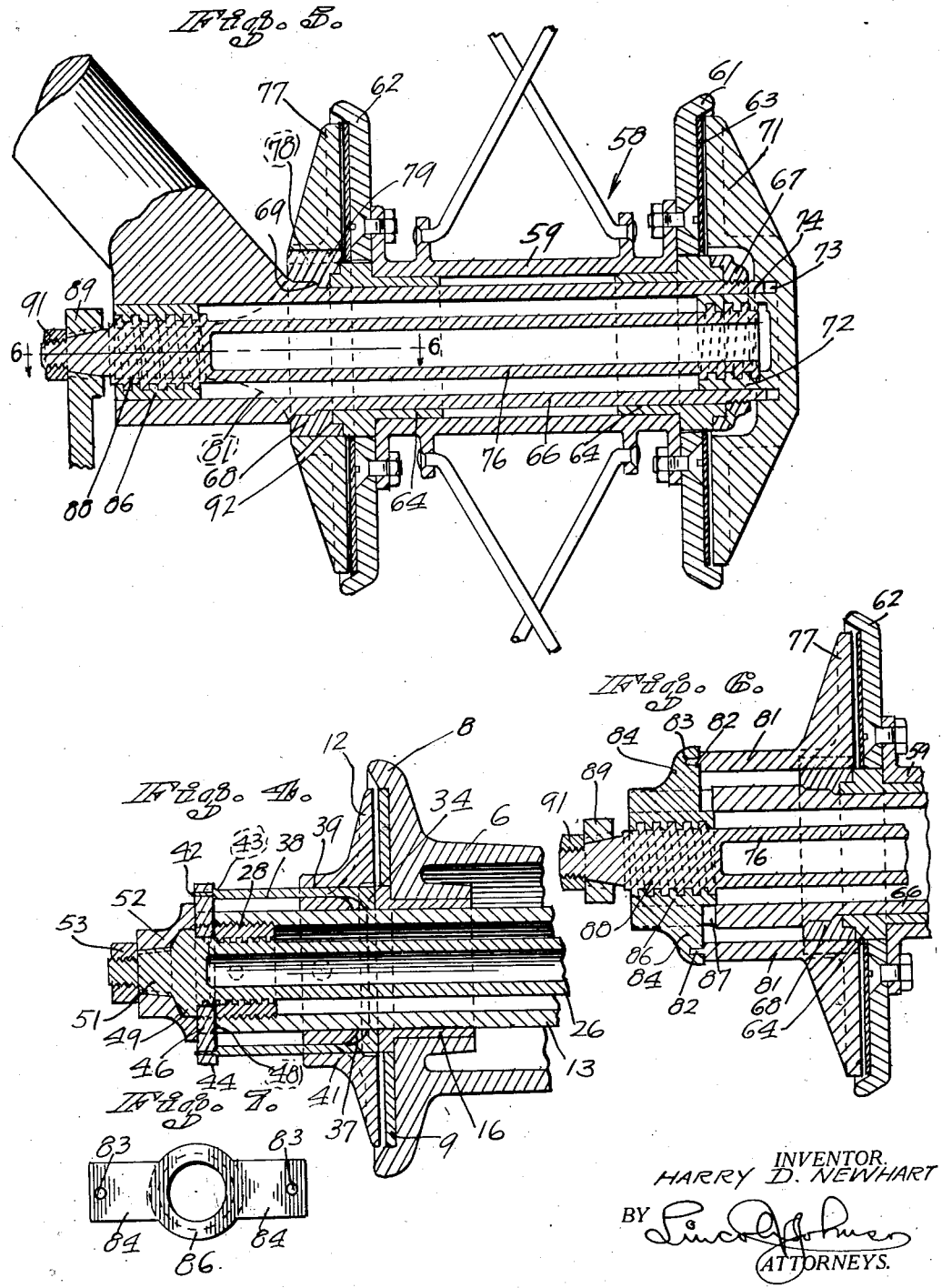

Patented Oct. 3, 1933

1,928,866

UNITED STATES PATENT OFFICE 1,928,866

DISK BRAKE

Harry D. Newhart, San Anselmo, Calif., assignor of one-half to Luke E. Robinson, Ross, Calif.

Application December 9, 1929. Serial No. 412,740

17 Claims. (Cl. 188—18)

This invention relates to brakes and particularly to brakes of the friction disk type.

It is the primary object of the invention to provide a friction disk brake mechanism by means of which frictional pressure is exerted on both ends of a rotary hub, so as to press the rotary wheel therebetween, whereby the rotation thereof is retarded.

Another object of the invention is the provision of a disk brake, in which a disk is arranged at each side of the rotary wheel, and which applies the brake pressure to the wheel by the frictional engagement of said disks with the opposite sides of the wheel, the construction of this brake may be accomplished either by providing a slidable hub, pressed against one disk by the action of the opposite disk on the wheel, or by the simultaneous applying of both disks to the opposite ends or sides of a non-slidable rotating hub of the wheel.

Other objects and advantages are to provide a brake, and particularly a brake of the friction disk type, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings wherein

Fig. 1 is a cross sectional view of a wheel hub and a brake constructed in accordance with my invention, and assembled on an axle;

Fig. 2 is a sectional view of the brake, the section being taken on the line 2—2 of Fig. 1;

Fig. 2a is a detail view of the thrust collar of my brake;

Fig. 3 is a fragmental sectional view showing the attachment of one of the disks upon the end of the axle, the section being taken on the line 3—3 of Fig. 1;

Fig. 4 is a sectional view of the thrust end of my brake, the section being taken on the line 4—4 of Fig. 1;

Fig. 5 is a sectional view of another embodiment of my brake mechanism;

Fig. 6 is a fragmental, sectional view of an end of my brake, the section being taken on the line 6—6 of Fig. 5; and Fig. 7 is a detail view of the operating nut of the second mentioned embodiment of my brake.

In its general organization my brake mechanism comprises a hub 6, the opposite sides or ends 7 and 8, of which are provided with free friction faces 9 for frictional engagement by friction disks 11 and 12. On the hub 6 is mounted in the usual manner a tire, not shown. The brakes herein described are particularly adapted for use in connection with landing gears for airplanes and the like, and the tires commonly used on the wheels of such landing gears are wide, comparatively soft, special balloon tires, which allow a certain degree of axial shifting of the hub 6. The hub 6 is rotatably mounted on a hollow axle 13, which extends from the usual support 14. For the purpose of facilitating the mounting of the tires thereon, the hub 6 is made of two half sections arranged end to end, each half having an anti-friction bearing 16 in the respective end thereof. The opposite sections of the hub 6 are held together by means of bolts 17.

The brake disk 11 has spline slots 18 therein, which slidably engage with the corresponding splines 19 of the end of the axle 13. Normally there is sufficient clearance left between the ends of the slots 18 and the end of the axle 13 to allow the sliding of the disk 11 toward the end 7 of the hub 6. The splines 19 prevent the rotative movement of the disk 11. The other brake disk 12 is fixedly held in position by a pin 21, which extends thru the double rib 22 and a flange 23, between the ribs 22, which flange 23 is an integral part of the support 14. A set screw 24 extending thru the hub of the disk 12 and into the axle 13, further secures the disk 12 against movement.

In order to apply brake pressure to the rotary hub 6 it is necessary to slide the disk 11 against the end 7 of the hub 6, and then to slide both the hub 6 and the disk 11, until the other end 8 of the hub 6 is brought into frictional contact with the disk 12. This sliding of the disk 11 is accomplished by means of an actuating bar 26, which extends thru the hollow axle 13. The bar 26 is threaded at 27 adjacent an end thereof, to threadedly engage a fixed nut 28, which latter in turn is threaded into the axle 13 and is held therein by means of a set screw 29. The outer end of the nut 28 is spaced from the adjacent end of the axle. On the other end of the bar 26 is an anti-friction washer 31 and a collar 32 threaded and fixed onto said bar end so as to be rotatable with the bar 26 and bear against the outer face of the hub of the disk 11. When the bar 26 is rotated so as to unscrew the same from the nut 28, it moves axially out of the axle 13, whereby the collar 32 is advanced therewith against the disk 11, pressing the same against the end 7 of the hub 6, to advance the latter toward the other disk 12. In this manner the hub 6 is pressed or squeezed between the non-rotative disks 11 and 12 and the rotation thereof is effectively retarded.

When the brake is released the hub 6 is prevented from sliding on the axle 13, by means of thrust members 33 and 34. The thrust member 33 is held fixedly in place by a lock nut 36, threadedly engaged with the other periphery of the end of the axle 13. This thrust member 33 limits the movement of the hub 6 in the direction of the disk 11, whereby a clearance is maintained between the friction face 9 of the end 7, and the disk 11. It is to be noted that the hub of the disk 11 is recessed to receive the thrust member 33 and the lock nut 36 therein. The member 33 is of the same diameter as the outer end of the respective bearing 16, which latter bears against the former.

The other thrust member 34 bears against the bearing 16 in the end 8 of the hub 6, and it is disposed in a recess 37 in the hub of the disk 12. The recess 37 is wider than the width of the thrust member 34, so as to allow for back and forth axial movement of the member 34 on the axle 13. From the member 34 extend rearwardly thrust arms 38, diametrically opposite each other. The arms 38 are at right angles to the plane of the member 34, which latter is of such diameter that the arms 38 formed at the peripheral edge thereof, extend in parallel spaced relation to the outer periphery of the axle 13. The arms 38 are guided in slots 39 formed in the hub 41 of the disk 12. The free end 42 of each arm 38 is reduced in thickness to form a shoulder at 43 which bears against an ear 44 of a thrust washer 46, when the said reduced end 42 is inserted in an aperture 47 of the respective ear 46. The thrust washer 46 is slidable within the end of the axle 13. Slots 48 are cut in the sides of the axle 13 at said end, in which the ears 44 are slidably held against rotation.

The thrust washer 46 is held in place between the outer face of the fixed nut 28, and an enlarged head 49 of the bar 26, outside of the enlarged head 49 a conical splined bar portion 51 receives an actuating lever 52 thereon, and is held in place by the usual lock nut 53. The end of the lever 52 is enlarged to bear against the ears 44, thereby to offer additional thrust reinforcement thereat.

When the bar 26 is screwed into the fixed nut 28, the head 49 thereof and the lever end 52 press the thrust washer 46 into the axle 13. The ears 44 of the washer 46 are urged against the shoulders 43 of the arms 38, thereby pressing the thrust member 34 against the bearing 16 in the end 8 of the hub 6. In this manner the hub 6 is held against axial movement on the axle 13. To apply the brake, the lever 52 is turned, by a suitable actuating mechanism, so as to unscrew the bar 26 from the nut 28, whereby the bar 26 is withdrawn from the axle 13, in the direction of the disk 12. The movement of the bar 26, and of the head 49, and lever end 52 therewith, away from the end of the axle 13, releases the thrust washer 46, to permit the axial movement of the thrust member 34. This release of the thrust member 34 is substantially simultaneous with the engagement of the disk 11 with the face 9 of the end 7. Under the pressure of the disk 11 the hub 6 is moved axially into engagement with the other disk 12, the thrust member 34 being released in proportion with the movement of the hub 6. Thus the hub 6 is pressed or squeezed between the disks 11 and 12, and the large frictional braking surface of the non-rotative disks 11 and 12 effectively resists further rotation of the hub 6. In connection with the large balloon tires now used on airplane landing gears, this movement of the hub 6 is readily permitted. In order to release the brake, the lever 52 is rotated to screw the bar 26 into the nut 28, thereby advancing the bar 26 in the direction of the disk 11. This returning movement releases the pressure on the disk 11, at the same time urges the thrust member 34 against the respective bearing 16 of the hub 6, to move the said hub 6 out of contact with the fixed disk 12, and to confine the hub 6 between the thrust members 33 and 34. The disk 11 is thrown out of contacting position by the rotation of the hub 6. Resilient or other means may be provided to move the disk 11 away from the end 7, when the brake is released, but under normal operative conditions the disk 11 will be thrown off the end 7, due to the rotation of the hub 6, when the brake is released.

In the soft balloon tires now used on landing gears, the valve extends thru the hub 6, therefore an aperture 54 is provided in the friction face 9 of the head 7, thru which access may be had to the valve of the tire. An aligning aperture is formed in the disk 12 for this purpose. Each of the disks 11 and 12 has a sectional, preferably tapered, arcuate slot 56 on the lower half of the respective central recess thereof, to throw off moisture, or lubricant, from the brake structure.

The embodiment of my brake shown in Figs. 5 and 6, is for use in connection with structures wherein the axial sliding of the hub of a wheel would cause inconvenience. In this embodiment a wire wheel 58 is shown, the hub 59 of which is flanged at the opposite ends thereof. To the flanged ends of the hub 59 are fixedly secured rotating disks 61 and 62, each of which has a friction face 63 on the outer side thereof. In each end of the hub 59 is a bearing 64 rotatable on an axle 66, which is supported in the usual manner. The hub 59 is held against axial movement at one end thereof, by a locknut 67 threaded on the free end of the axle 66 and engaging the bearing 64 within the disk 61. At the other end of the hub 59 a collar 68 is keyed upon the axle 66 against a shoulder 69 on said axle, and engages the bearing 64 in the disk 62.

Opposite the disk 61 is a friction disk 71, the hub 72 of which is slidable partly within the end of the axle 66. The disk 71 is held against rotative movement by the engagement of slots 73 in the hub thereof, with the splined end 74 of the axle 66. The hub 72 is internally threaded, to be engaged by the correspondingly threaded end of an actuating bar 76 within the axle 66.

Opposite the rotating disk 62 is a friction disk 77 the hub of which is splined to engage the splines 79 formed on the outer periphery of the collar 68, whereby the disk 77 is prevented from rotation. The disks 71 and 77 are ribbed on their outer faces for the purpose of reinforcing the same. From the hub 78 of the disk 77 extend arms 81, which have reduced ends 82 thereon. The reduced ends 82 are inserted in apertures 83 formed in the lugs 84 that extend in opposite directions from a nut 86. The nut 86 is slidable within the end of the axle 66 and is prevented from rotation by the sliding engagement of the opposite lugs 84 thereof, with slots 87 cut in the sides of the axle 66. The nut 86 is internally threaded to receive therein the correspondingly threaded portion 88 of the bar 76. The end of the bar 76 outside of the axle 66 is conically splined to hold the end of an actuating lever 89 secured thereon by a lock nut 91. The lever 89 is spaced from the end of the nut 86 to allow the free back and forth movement thereof in the end of the axle 66.

It is to be noted that the hub 72 and the nut 86 are oppositely threaded, namely, if one has left hand thread therein, the other has right hand thread. Thus, when the bar 76 is rotated the nut 86 and the hub 72 are forced to travel in opposite directions relatively to each other. The movement of the hub 72 carries the disk 71 therewith into or out of engagement with the friction face of the disk 61. The movement of the nut 86 in the direction of the disk 62 urges the arms 81 and the disk 77 toward the friction face of the rotating disk 62, and into engagement therewith. The returning, outward movement of the nut 86 releases the friction pressure on the disk 77. The disk 71 and the nut 86 are operated simultaneously by the rotation of the bar 76. This movement is usually comparatively slight, merely sufficient to move the disks 71 and 77 thru their small clearance into engagement with the respective friction faces, so as to press or squeeze the hub 59 between the two friction disks, thereby setting up efficient frictional resistance against its rotation.

The disks 71 and 77 are also provided with inclined drain apertures 92 thru which fluid or lubricant is drained from the bearings.

The rotary heads 7 and 8 as well as the rotary disks 71 and 77 are outwardly chamfered at the outer periphery of the respective friction faces thereof to throw off, by centrifugal force, all dirt or foreign particles that may accumulate between the friction disks and the friction surfaces.

Having thus described this invention, what I claim and desire to secure by Letters Patent is:

1. The combination with a hub rotatable on a hollow cantilever axle and having a friction surface formed on the outside face of each end thereof, of a brake mechanism comprising brake disks, one opposite each friction surface, being mounted on the axle to be held against rotation; brake actuating means extending thru the axle to cause relative axial displacement of the hub and the disks so as to apply and release the brake disk pressure on the said friction faces, and means adjacent the secured end of the axle for operating said means.

2. The combination with a hub rotatable on a hollow cantilever axle and having a friction surface formed on the outside face of each end thereof, of a brake mechanism comprising brake disks, one opposite each friction surface, being mounted on the axle to be held against rotation; brake actuating means extending thru the axle to cause relative axial displacement of the hub and the disks so as to simultaneously apply and release the brake disk pressure on both of the said friction faces, and means adjacent the secured end of the axle for operating said means.

3. The combination with a hub rotatable and axially slidable on an axle and having a friction surface formed on each end thereof, of a brake mechanism comprising a brake disk mounted on the axle and held against rotation with freedom of axial movement toward and away from the adjacent end of the hub; a second brake disk fixedly mounted in operative relation to the other end of the hub; and brake actuating means on the axle connected to the first disk to normally release said first disk out of engagement with the hub, means related to the actuating mechanism to hold the rotary hub out of engagement with the fixed disk, and an operating mechanism to operate said actuating mechanism to simultaneously release the hub holding means, and move said first disk into engagement with the end thereof, thereby to cause the hub to be pressed against the second disk by the pressure of the first disk thereon.

4. The combination with a hub rotatable and axially slidable on a cantilever axle and having a friction surface formed on each end thereof, of a brake mechanism comprising a brake disk mounted on the axle and held against rotation with freedom of axial movement toward and away from the adjacent end of the hub; a second brake disk fixedly mounted in operative relation to the other end of the hub; a fixed thrust member on the axle to limit the axial movement of the hub toward the first disk, a movable thrust member slidable on the axle to normally hold the hub against movement toward the fixed disk; brake actuating means connected to the first disk and to said slidable thrust member to normally urge the thrust member against the hub, and being adapted to simultaneously release said slidable thrust member and move the first disk against the hub thereby to press the hub between the said friction disks, and means adjacent the secured end of the axle for operating said means.

5. The combination with a hub rotatable and axially slidable on an axle and having a friction surface formed on each end thereof, of a brake mechanism comprising a brake disk mounted on the axle and held against rotation with freedom of axial movement toward and away from the adjacent end of the hub; a second brake disk fixedly mounted in operative relation to the other end of the hub; a fixed thrust member on the axle to limit the axial movement of the hub toward the first disk, a movable thrust member slidable on the axle to normally hold the hub against movement toward the fixed disk; and brake actuating means connected to the first disk and to said slidable thrust member to normally urge the said slidable thrust member against the hub, and being adapted to simultaneously release said slidable thrust member and move the first disk against the hub thereby to press the hub between the said friction disks, said brake actuating means comprising an actuating bar threadedly secured in said axle having an end thereof rotatably connected to the first disk to move said first disk axially when the bar is rotated, means slidable on the bar against which the slidable thrust member bears, said last mentioned means being held against rotation and being advanced against the hub as the brake is released and being free to axially move with the hub as the brake is applied.

6. In combination a hollow axle, a hub rotatable thereon, having an enlarged head at each end thereof, a friction face on each head, a disk fixed on the axle opposite one of the friction faces, a second disk slidably mounted on the axle opposite the other friction face and being held against rotation thereby; a brake actuating bar extending thru the axle and threadedly engaging the same, having an end thereof rotatably connected to said slidable disk and adapted to move said second disk toward the hub; a fixed thrust member on the axle to limit the sliding of the hub on the axle in the direction of the second disk, a movable thrust member slidable on the axle to normally hold the hub against sliding in the direction of the first disk, thrust means related to the axle and held by the adjacent end of the bar against which the said slidable thrust member abuts, to release said thrust member when the brake is applied by the rotation of the bar, to allow the pressing of the hub between the opposite friction disks.

7. In combination a support, a hollow axle extending therefrom, a hub rotatable on the axle being held against axial sliding, a friction face at each end of the hub, a disk opposite each friction face being slidable on the axle and being held against rotative movement thereby; and means extended through the hollow axle being adapted to bring said disks into frictional engagement with the respective faces.

8. In combination a support, a landing gear, a hollow axle thereon, a hub rotatable on the axle being held against axial sliding, a friction face at each end of the hub, a disk opposite each friction face being slidable on the axle and being held against rotative movement thereby; and means adjustably extended through the hollow axle being adapted to simultaneously bring said disks into frictional engagement with the respective friction faces.

9. In combination a hollow axle, a hub rotatable thereon, being held against axial sliding, a friction face at each end of the hub, a disk opposite each friction face being slidable on the axle and being held against rotative movement thereby, an internally threaded hub of one disk being slidable in an end of the axle, a thrust member slidable in the other end of the axle being adapted to press the other disk toward the respective friction face, said thrust member being internally threaded, the threads of the thrust member and of the disk hub operating in opposite directions, a bar threadedly engaging both the thrust member and the disk hub to move the same in opposite directions thereby to apply and release the disk pressure on the respective friction faces; and means to turn said bar for actuating the said thrust member and the disks.

10. The combination with a wheel supporting member of the landing gear of an aircraft, an axle extended to one side of said member and being supported only at one end thereof, of a rotary hub on the axle having friction faces on the opposite ends thereof, a non-rotative disk related to the axle opposite each friction face, actuating means extended through the axle to establish frictional contact between the disks and the respective friction faces; and means on the side adjacent the said member whereby said actuating means is operated.

11. The combination with a wheel supporting member of an aircraft, a cantilever axle on one side of said member, and a rotatable hub on the axle, of friction disks formed on the ends of the hub, brake disks on the axle operatively related to the respective friction disks; an actuating mechanism including an element extended through the axle, to establish frictional engagement between the friction faces and the disks, and an operating element connected to the actuating mechanism at the side adjacent the said supporting member.

12. In a landing gear for aircrafts, the combination with an axle of the landing gear, of a hub being slidable and rotatable on the axle, a friction surface formed on the outer face of each end of the hub, a fixed friction disk on the landing gear opposite one of said friction faces, a non-rotatable friction disk slidable relatively to the axle and being disposed opposite the other friction face of the hub, and means to move said second disk against the adjacent end of the hub so as to slide the hub against the first disk and establish frictional engagement between the respective friction faces and disks.

13. In a landing gear for aircrafts, the combination with an axle of the landing gear, of a hub being slidable and rotatable on the axle, a friction surface formed on the outer face of each end of the hub, a fixed friction disk on the landing gear opposite one of said friction faces, a non-rotatable friction disk slidable relatively to the axle and being disposed opposite the other friction face of the hub, said axle being hollow, an element extended through the hollow axle and connected to the second disk; and means to actuate said element to move the said second disk against the adjacent end of the hub thereby to move the hub against the first disk to apply frictional contacts at both ends of the hub.

14. In a landing gear for aircrafts, the combination with an axle of the landing gear, of a hub being slidable and rotatable on the axle, a friction surface formed on the outer face of each end of the hub, a fixed friction disk on the landing gear opposite one of said friction faces, a non-rotatable friction disk slidable relatively to the axle and being disposed opposite the other friction face of the hub, said axle being hollow, an element slidably and non-rotatably held within the hollow shaft and connected to said second disk; and actuating means to move said element relatively to said axle to move said second disk against the hub thereby to move the hub against the first disk, and to establish frictional contact on both friction faces of the hub.

15. In combination a hollow axle, a hub rotatable thereon, being held against axial sliding, a friction face at each end of the hub, a disk opposite each friction face being slidable on the axle and being held against rotative movement thereby, an internally threaded hub on one disk being slidable in an end of the axle, a thrust member slidable in the other end of the axle being adapted to press the other disk toward the respective friction face, said thrust member being internally threaded, the threads of the thrust member and of the disk hub operating in opposite directions, a bar threadedly engaging both the thrust member and the disk hub to move the same in opposite directions thereby to apply and release the disk pressure on the respective friction faces, the outer periphery of said friction faces being chamfered outwardly and spaced from the outer periphery of the respective disks to allow the centrifugal discharge of foreign substances from between the friction faces and the disks, each disk having a drain opening cut thru the hub thereof to discharge accumulated fluid thereat, and means to turn said bar for actuating said thrust member and disks.

16. In a brake mechanism for airplane landing gears, a hollow axle on the landing gear, a rotary hub on the axle, having friction faces on the opposite ends thereof a non-rotative disk related to the axle opposite each friction face, a turnable element extended through the axle, means to turn said element at will; and means of connection between said element and said disks to press the disks against the friction faces when the said element is actuated.

17. In a brake mechanism of the character described, a hollow axle, a hub rotatable thereon, a friction disk on each end of the hub, a brake disc opposite each of said friction disks, means to prevent the rotation of the brake disks, a brake actuating element extended through the hollow axle, means of connection between the brake actuating element and said brake disks to apply both brake disks as the actuating element is operated, and means to operate said actuating element.

HARRY D. NEWHART.